United States Patent [19]

Glöckler et al.

[11] 4,223,643
[45] Sep. 23, 1980

[54] METHOD AND APPARATUS FOR FUEL MIXTURE ENRICHMENT DURING ACCELERATION

[75] Inventors: Otto Glöckler, Renningen; Harro Herth, Schwieberdingen; Thomas Wilfert, Markgröningen; Bernd Kraus, Gerlingen, all of Fed. Rep. of Germany

[73] Assignee: Robert Bosch GmbH, Stuttgart, Fed. Rep. of Germany

[21] Appl. No.: 878,505

[22] Filed: Feb. 16, 1978

[30] Foreign Application Priority Data

Feb. 21, 1977 [DE] Fed. Rep. of Germany ....... 2707411

[51] Int. Cl.³ .......................... F02B 3/00; F02M 39/00
[52] U.S. Cl. ................................... 123/492; 123/445; 123/489
[58] Field of Search ...... 123/32 EA, 32 EH, 119 EC, 123/179 L, 139 AW

[56] References Cited

U.S. PATENT DOCUMENTS

| | | | |
|---|---|---|---|
| 3,661,126 | 5/1972 | Baxendale | 123/32 EH |
| 3,971,354 | 7/1976 | Luchaco | 123/179 L |
| 3,981,288 | 9/1976 | Wessel | 123/139 AW |
| 4,221,554 | 10/1978 | Sueishi | 123/32 EA |

FOREIGN PATENT DOCUMENTS 2550637  5/1976  Fed. Rep. of Germany ..... 123/32 EA

*Primary Examiner*—Ronald B. Cox
*Attorney, Agent, or Firm*—Edwin E. Greigg

[57] ABSTRACT

The fuel mixture preparation system of an internal combustion engine, especially a continuous fuel injection system, is engaged during intended engine accelerations by a pressure sensor in the induction manifold which responds to increasing manifold pressure to close a switch. The switch closure affects a pressure control valve that changes the control pressure in the fuel injection system and thereby causes temporary fuel enrichment until the differential pressure in the pressure sensor has returned to equilibrium. The signal from the pressure sensor may be extended arbitrarily by interposition of an electronic timing circuit which is constructed as an integrating circuit so that its output signal, when processed by a comparator, will produce a proportionally extended actuation signal for the control valve.

9 Claims, 5 Drawing Figures

METHOD AND APPARATUS FOR FUEL MIXTURE ENRICHMENT DURING ACCELERATION

BACKGROUND OF THE INVENTION

The invention relates to a method and an apparatus for providing a temporary enrichment of the fuel-air mixture fed to an internal combustion engine during acceleration. The method and apparatus of the invention may be used with a fuel mixture preparation system of any kind and is based on monitoring the pressure changes in the induction manifold of the engine during acceleration. The invention relates particularly well to continuous electronic injection systems in which the fuel-air ratio is controlled by a control pressure of hydraulic fluid and wherein the control pressure is altered by the method and apparatus of the invention so as to superimpose on the control process already present an additional change for the purpose of fuel mixture enrichment. The continuous fuel injection system to which this invention may be particularly adapted may especially be operating under the control of an oxygen sensor which monitors exhaust gas composition, i.e. a so-called $\lambda$ control process.

Known fuel mixture preparation systems for internal combustion engines of motor vehicles normally include a provision for admitting additional fuel for engine acceleration. In the simplest case, a carburetor may be equipped with a so-called accelerator pump which supplies additional raw fuel when the gas pedal is depressed. In known electronic fuel injection systems, an enrichment during acceleration may take place on the basis of the motions of a baffle plate in the induction manifold which responds to the changing air flow rate and which may be part of a so-called air flow rate meter.

OBJECT AND SUMMARY OF THE INVENTION

It is a principal object of the invention to provide a method and an apparatus for enrichment of the fuel-air mixture during engine acceleration. It is another principal object of the invention to provide a fuel mixture enrichment system which is distinguished with respect to the prior art by the absence of transducer systems and switching systems previously required in so-called transition enrichment systems. In particular, it is an object of the invention to provide fuel enrichment without the necessity of installing a solenoid valve, a pressure switch and a thermal switch as previously required. It is yet another object of the invention to describe an apparatus for selecting the time interval during which the enrichment of the fuel-air mixture takes place.

These and other objects of the invention are attained by monitoring the induction tube pressure with a differential pressure cell which responds to the rapidity of application of the gas pedal. The actuation of the differential cell is then processed into an electrical signal which is used to alter the control signal that governs the operation of the fuel injection valves in the sense of enriching the fuel-air mixture.

The invention will be better understood as well as further objects and advantages thereof become more apparent from the ensuing detailed description of a number of preferred embodiments taken in conjunction with the drawing.

DESCRIPTION OF THE PREFERRED EMBODIMENTS

Figure 1:
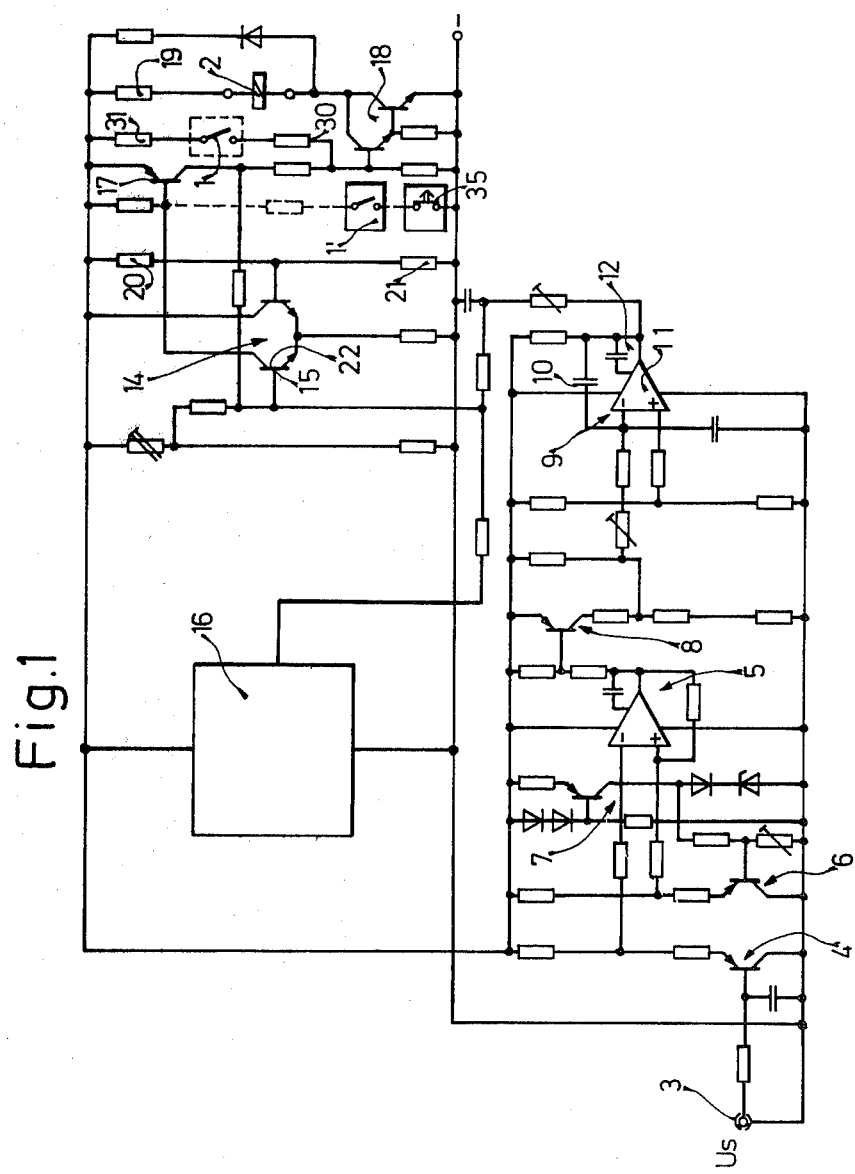
FIG. 1 is a circuit diagram of a portion of a known fuel injection system for continuous fuel injection including two embodiments of the invention.

The basic principle of the present invention is that when the gas pedal is depressed and the engine is intended to be accelerated, the induction tube pressure undergoes a sudden change and it is this change which is exploited to admit additional fuel to enrich the fuel-air mixture. In principle, the fuel mixture preparation system may be a carburetor or continuous or intermittent fuel injection systems. The invention is however particularly suited to be used with a continuously injecting electronic fuel injection system, for example Applicants' "K-Jetronic" system. The preferred embodiments of the present invention will thus relate directly to the aforementioned continuous injection system. This system includes fuel injection valves and other components that are not explicitly shown in the drawing. The known continuous fuel injection system also includes a control circuit which obtains its primary control signal from an oxygen sensor located in the exhaust system. The detailed description of this circuit will be given below. A primary component of the improvement due to the present invention is a differential pressure switch, identified by the numeral 1 in FIG. 1, and indicated only schematically to represent the class of electrical switches which respond to differential pressure. Such a pressure switch may, for example, be a bicameral switch divided by a diaphragm, one of the chambers being exposed to induction tube pressure and the other to the ambient atmosphere. When the throttle is open, the induction tube pressure rises, whereby the diaphragm is displaced and actuates the switch 1. Generally, the switch is intended to return to its original state after a period of time and for this purpose the pressure chamber of the switch has a small opening which permits it to reassume pressure equilibrium. The basic behavior of the switch is essentially digital, i.e. it is either on or off, but its time of duration may be variable. However, the opening in the diaphragm permitting reestablishment of pressure equilibrium cannot be made arbitrarily small so that the times during which the switch 1 is closed cannot be made arbitrarily long. For this reason, a preferred exemplary embodiment of the invention to be described further in detail below permits an extension of the time of closure of the switch or of the switching signal beyond the actuation time of the differential pressure switch.

The overall circuit depicted in FIG. 1 relates to one possible embodiment of an electronic continuous injection system which is based on the control signal of a so-called $\lambda$-sensor, i.e. an oxygen sensor, located in the exhaust system of the engine. The overall control system described in FIG. 1 regulates a so-called control pressure which engages fuel metering components, not shown, in the sense of changing the degree of enrichment of the fuel-air mixture. A control valve 2 which is subject to the influence of the processed signal from an oxygen sensor 3 changes the control pressure which generally opposes a constant fuel pressure and thereby changes the fuel-air ratio. Generally, an increase of the control pressure results in a leaning out of the fuel-air mixture. The portion of the fuel injection system shown in FIG. 1 is only that part which actuates and controls the control valve 2 on the basis of the λ-sensor signal. The improvement due to the present invention is directly associated with this part of the known fuel injection system.

In FIG. 1, the output signal of the λ-sensor 3 is fed to an impedance converter 4 whence it passes to the input of a comparator 5 whose other input receives a reference voltage via a second impedance converter 6. The base of the transistor 6 is connected to elements 7 all serving to vary the voltage applied to the second input of the comparator 5. The output of the comparator 5 is a rectangular signal which is either high or low depending on the momentary value of the λ-sensor signal. The output signal from the comparator is fed to an intermediate amplifier 8 and thence to an integrator 9 constituted by an operational amplifier 11 with a feedback capacitor 10. The output 12 of the operational amplifier 11 will be an increasing or decreasing sawtooth voltage, Depending on the frequency of switchover of the comparator output signal. The sawtooth voltage from the integrator is used to provide an additional control of the fuel-air mixture ratio. In order to condition the signal from the integrator 9 for this purpose, it is fed to a comparator 14 at an input 15 where it also receives the output of an oscillator 16. The comparator 14 controls a transistor 17 which is turn activates a Darlington transistor 18 which directly actuates the aforementioned control valve 2 in series with a resistor 19. The oscillator 16 may be of general construction and will not be further described. Its output signal is a sawtooth voltage at a relatively low frequency, for example 70 Hz. Disregarding for a moment the influence of the integrator output signal on the comparator 14, the latter may be adjusted by voltage divider resistors 20 and 21 such that the collector of its output transistor 22 will be a rectangular voltage with equal keying ratio, i.e. a symmetrical pulse of ratio 1:1. When the sawtooth signal from the integrator 9 is now superimposed on the oscillator signal at the input to the transistor 15, the keying ratio, i.e. the width of the "on" portion of the pulse with respect to the "off" portion of the pulse is changed, and the times during which the valve 2 will be energized will differ from the time during which it is open, while still being subject to the overall control of the λ-sensor. The signal which activates the pressure control valve 2 has a sufficiently high frequency so that the pressure of the control fluid does not fluctuate, due partly also to the integrating effect of the mechanical inertia of the system. By changing the keying ratio, i.e. the pulse width of the control voltage for the output transistor 18, the valve 2 changes the control pressure for the fuel metering system and thus effectively changes the fuel quantity metered out and the ratio of fuel-to-air.

It is at this point that the method and apparatus according to the present invention engages the fuel preparation system. In a first exemplary embodiment, the invention provides the aforementioned differentiating pressure switch 1 that has an electrical contact which is connected in series with two resistors 30 and 31, the entire combination being connected in parallel with the transistor 17 as illustrated in FIG. 1. Whenever the differentiating pressure switch 1 is closed due to an increase in pressure in the induction tube, the fuel-air ratio is temporarily increased because the transistor 17 is bypassed and the output transistor 18 is directly actuated, thereby opening the valve 2. This action causes a decrease of the control pressure and thus an enrichment of the fuel-air mixture. Whenever the pressure switch 1 is closed, the feedback control process is effectively interrupted and the valve 2 is no longer being actuated at the frequency of the oscillator 16. By effectively short circuiting the transistor 17, the mixture is enriched by a factor equal to one half of the control range of the closed loop, if under normal closed loop control the actuation pulses were approximately symmetric. The presence of the resistors 31 and 30 prevents damage to the circuit if the pressure switch were to be short circuited or connected accidentally to the positive supply line.

In a second and alternative variant of the present embodiment, the temporary enrichment may take place in dependence on the engine temperature, for example the cooling water temperature. This variant is shown in FIG. 1 in dashed lines and includes a pressure switch 1'. The pressure switch 1' is connected in series with a thermal switch 35 which opens if the engine reaches a predetermined temperature but which is closed in a specified region of the warm-up phase so that a temporary enrichment may take place. For the example of a thermal switch 35 which closes a contact to ground, it is shown to be connected such that it engages the base of the transistor 17 in the appropriate manner. If both the thermal switch 35 and the differentiating pressure switch 1' is closed, the transistor 17 always conducts and the valve 2 is constantly opened by the conducting output circuit 18 and the control pressure of the engine will be reduced, thereby increasing the fuel within the mixture. A transistory enrichment of this type will be effective only when the thermal switch is closed, i.e. during the warm-up phase of the engine.

Whenever an internal combustion engine is being operated under feedback control of a λ-sensor, there will be times when such closed-loop control is not feasible, for example because the λ-sensor is not capable of delivering a useable control signal. This condition may often occur when a cold engine is being started and during portions of the warm-up running.

Figure 1A:
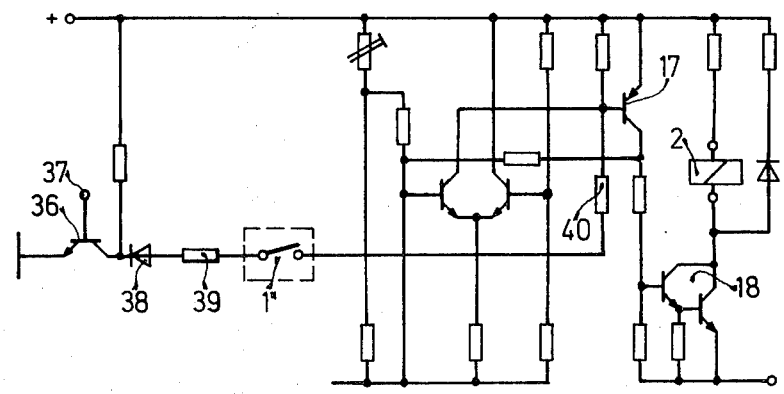
FIG. 1a is an illustration of a third embodiment of the invention.

Accordingly, a second exemplary embodiment of the invention, illustrated in FIG. 1a, shows a circuit in which the temporary enrichment takes place only when the fuel injection system has been switched over from closed-loop control to open-loop control. When this is the case, some electronic semiconductor elements, for example the transistor 36 in FIG. 1a, will be rendered conducting by suitable signals at the base 37. The present invention makes use of this open-loop status by connecting a diode 38 and a further resistor 39 in series with the aforementioned differentiating pressure switch (1") from the collector of the transistor 36 via a further resistor 40 to the base of the transistor 17 which finally controls the output Darlington 18. Accordingly, if the differentiating pressure switch closes for a short period of time, the temporary enrichment of the mixture can occur only if, at the same time, the entire fuel injection system is being operated in open-loop control, i.e. when the transistor 36 conducts. In such an embodiment, the thermal switch 35 can be dispensed with because the open-loop control is itself an indication that the engine is being started or run up, i.e. from a cold condition.

It has been pointed out above that the maximum temporary enrichment of the fuel-air mixture is equal to one-half the normal control range. However, it may be, for example during rapid acceleration and during warm-up, that substantially higher enrichment factors are required to operate the engine smoothly and without hesitation. The fuel required for this type of acceleration, for example an increase of fuel by a factor of 20 to 30 percent, may also be obtained by extending the period of time during which the excess fuel is being delivered. The extension of this time may be obtained by an increase in the volume of the pressure switch 1 or by a decrease of the equalizing aperture in the diaphragm. However, these variables are subject to limitations; for example the increase of the size of the cell is unfavorable because it becomes more expensive and too large for practical installation and very small openings in the diaphragm are difficult to make and maintain at the required small tolerances due to soiling, etc.

Figure 2:
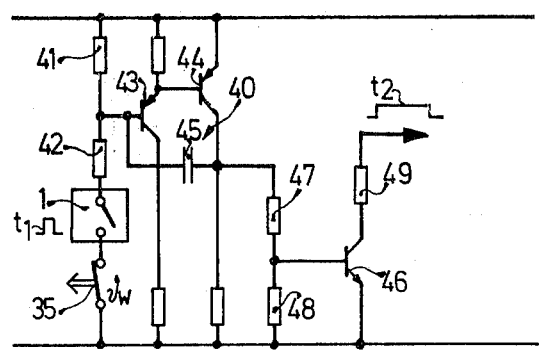
FIG. 2 illustrates a circuit for a fourth embodiment of the invention.

In a third exemplary embodiment of the invention, these disadvantages are avoided and the excess fuel is provided by multiplying the time of increase generated by the differential pressure switch with a fixed factor. In the simplest case, this is done by associating with the pressure switch a timing circuit which serves to prolong the effective switching time of the pressure switch, preferably proportionally. The period of time during which the differentiating pressure switch remains effective depends on the rapidity with which the gas pedal is actuated, i.e. on the rate of change of the induction tube pressure as well as the magnitude of the pressure increase. In the third embodiment of the invention illustrated in FIG. 2, there is shown an electronic timing circuit for multiplying the effective enrichment time by a given factor. In this embodiment, the pressure switch 1 actuates a so-called Miller integrator 40 which consists of two transistors 43 and 44 and an integrating capacitor 45 which connects the collector of the transistor 44 to the base of the first transistor 43. The input of the Miller integrator, i.e. the base of the transistor 43, is connected to the differentiating pressure switch at the tap of two series resistors 41 and 42, and if suitable, in series with the previously mentioned thermal switch 35. The presence of the thermal switch 35 is optional if no temperature-dependence of the enrichment is desired.

Figure 3:
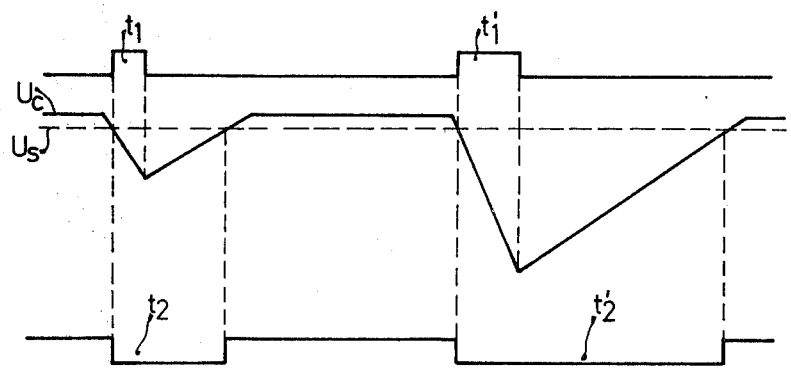
FIG. 3 is a diagram illustrating the voltage pulses at various points of the system.

If the pressure switch 1 closes, for example for a duration t1 (see FIG. 3) the capacitor 45 discharges to ground and the rate of discharge is determined by the resistor 42 and the capacitor 45. As soon as the pressure switch 1 reopens, the Miller integrator recharges the capacitor 45 via the resistor 41 whose magnitude and that of the capacitor 45 are exclusively responsible for the determination of the charging time constant. Accordingly, the size of the resistors 41 and 42 determines the multiplication factor for the desired total enrichment time. The collector of the transistor 44 is connected via series resistors 47 and 48 to the base of a transistor 46 from the collector of which is taken the final effective enrichment time t2. The curve $U_c$ in FIG. 3 illustrates the voltage at the capacitor 45 while the curve $U_s$ illustrates the switching threshold of the transistor 46. The collector of the transistor 46 is connected via the resistor 49 to the base of the transistor 17 of FIG. 1 which then conducts during the period t2 and which provides the maximum available enrichment as previously discussed. If the duration of the switching signal from the differential pressure switch 1 is greater, for example as illustrated in FIG. 3 by the pulse t1', the total charge accumulated on the capacitor 45 will be greater, thus increasing the charging and discharging times resulting in an output pulse t2' of increased length.

The person skilled in the art will appreciate that the polarity of the semiconductors shown in the diagrams could be reversed if a suitable alternation of the supply voltages were to take place. In such a case, the Miller integrator for example could be switched to a positive voltage rather than to ground which may be useful if a thermal switch 35 is not present.

The effect of the timing circuit or the output of the transistor 46 may be used at some other part of the circuit of FIG. 1 provided that it causes the valve 2 to be actuated in the sense of providing temporary enrichment.

Figure 4:
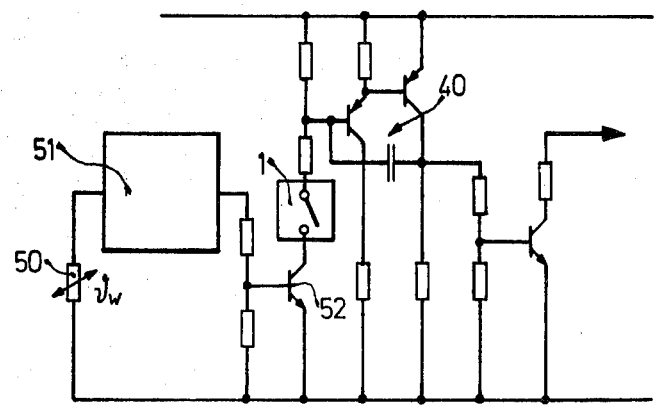
FIG. 4 is a circuit diagram illustrating a fifth embodiment of the invention including an electronic temperature switch.

In a fourth embodiment of the invention, the mechanical thermal switch 35 may be replaced by an electronic temperature switch which senses the, for example, cooling water temperature of the engine and may be an NTC resistor. A circuit including this resistor is shown in FIG. 4 which illustrates an NTC resistor 50. It is connected to an electronic temperature switch 51 that controls a transistor 52 connected in series with the differentiating pressure switch 1. All other associated circuit elements are identical to those of the illustration of FIG. 2 and will not be further discussed. A circuit employing an electronic temperature switch 51 may be especially desirable if such an NTC resistor is also used to control the warm-up phase of the engine. In the embodiment illustrated in FIG. 4, the transistor 52 will conduct below a certain temperature level and thus permit the differentiating pressure switch 1 to engage the timing circuit. The internal structure of the electronic temperature switch 51 is known. In the known circuit, the effective resistance of the NTC resistor is converted to a proportional voltage which causes the blockage of the transistor 52 at a certain temperature, thereby making the enrichment circuit ineffective.

The foregoing relates to preferred exemplary embodiments of the invention, it being understood that other embodiments and variants thereof are possible within the spirit and scope of the invention.

What is claimed and desired to be secured by letters patent of the United States is:

1. An apparatus for changing the ratio of the fuel-air mixture fed to an internal combustion engine, said engine including an induction tube and a continuous fuel injection system in which a fuel metering mechanism responds to the pressure of a control fluid maintained by a control valve, said control valve being actuated by circuit means responsive to induction tube pressure and the rotational speed of the engine, the improvement which comprises:
   a differentiating pressure switch disposed in said induction tube, an electrical switch coupled to said differentiating pressure switch for generating an electrical signal in response to increases in induction tube pressure,
   an oscillator connected to a source of power to provide a wave shaped output signal,
   a comparator circuit responsive to the wave shaped output signal of the oscillator and having an output,
   a first transistor connected to said source of power to provide a current path and responsive to said comparator, said electrical switch being disposed in said current path and a power transistor controlled by said first transistor for actuating said control valve so that upon acceleration of the engine, the fuel-air mixture is enriched.

2. An apparatus as defined by claim 1, further comprising a thermally responsive electrical switch connected in series with said differentiating pressure switch to inhibit the effect of said differentiating pressure switch for normal engine temperatures.

3. An apparatus as defined by claim 2, including means for connecting said differentiating pressure switch and said thermal switch to the base of said first transistor.

4. An apparatus as defined by claim 1, wherein said differentiating pressure switch includes two chambers separated by a diaphragm, one of said chambers communicating with the interior of the induction tube, said electrical switch being actuated by said diaphragm, and said diaphragm has an aperture for permitting the gradual equalization of pressure differences in said two chambers, and wherein said electrical switch is connected at one side with said control valve and at the other side with a circuit element which conducts only when said fuel injection system operates in forward open-loop control; whereby the enrichment of the fuel-air mixture on the basis of induction tube pressure increase is possible only during open-loop fuel injection control.

5. An apparatus as defined by claim 4, wherein said electrical switch is connected via a resistor to the base of said first transistor and further connected via a resistor and a diode in series with the collector-emitter path of a second transistor, said second transistor being conducting whenever said fuel injection system operates in open-loop control.

6. An apparatus as defined by claim 1, wherein said differentiating pressure switch includes two chambers separated by a diaphragm, one of said chambers communicating with the interior of the induction tube, said electrical switch being actuated by said diaphragm, and said diaphragm includes an aperture for permitting the gradual equalization of pressure differences in said two chambers, wherein said electrical switch is connected to the input of a timing circuit, said timing circuit delivering a pulse the duration of which depends on said pressure signal from said differentiating pressure switch.

7. An apparatus as defined by claim 6, wherein said timing circuit is a Miller integrator having an output and wherein said electrical switch discharges the timing capacitor of said Miller integrator during the time of closure; whereby the output pulse from said Miller integrator is longer than the electrical pressure signal from said electrical switch by an amount of time equal to the charge exchange time of said timing capacitor.

8. An apparatus as defined by claim 7, including an intermediate transistor connected between the output of said Miller integrator and the base of said first transistor.

9. An apparatus as defined by claim 7, wherein said electrical switch in said differentiating pressure switch is connected in series with a semiconductor element controlled by an electronic temperature switch, said temperature switch being responsive to a temperature-dependent resistor disposed in the cooling system of said internal combustion engine.

* * * * *